(12) United States Patent
Long et al.

(10) Patent No.: US 7,322,899 B1
(45) Date of Patent: Jan. 29, 2008

(54) ELECTRO-HYDRAULIC CONTROL SYSTEM FOR AN ELECTRICALLY VARIABLE HYBRID TRANSMISSION

(75) Inventors: Charles F. Long, Pittsboro, IN (US); Michael D. Foster, Carmel, IN (US)

(73) Assignee: General Motors Corporation, Detroit, MI (US)

( * ) Notice: Subject to any disclaimer, the term of this patent is extended or adjusted under 35 U.S.C. 154(b) by 282 days.

(21) Appl. No.: 11/115,102

(22) Filed: Apr. 26, 2005

(51) Int. Cl.
*F16H 31/00* (2006.01)

(52) U.S. Cl. .................................. 475/116; 475/119
(58) Field of Classification Search ................ 477/93, 477/116, 127, 128, 121, 130, 131, 906, 138; 475/116, 119, 93, 120, 121, 127, 128
See application file for complete search history.

(56) References Cited

U.S. PATENT DOCUMENTS

| 4,070,927 | A | | 1/1978 | Polak | |
|---|---|---|---|---|---|
| 4,827,806 | A | | 5/1989 | Long et al. | |
| 5,601,506 | A | * | 2/1997 | Long et al. | 475/120 |
| 5,616,093 | A | | 4/1997 | Long et al. | |
| 6,520,881 | B1 | * | 2/2003 | Long et al. | 475/119 |
| 6,569,050 | B2 | * | 5/2003 | Suzuki et al. | 475/122 |
| 6,585,617 | B1 | | 7/2003 | Moorman et al. | |
| 7,140,993 | B2 | * | 11/2006 | Long et al. | 475/119 |
| 2003/0078126 | A1 | | 4/2003 | Holmes et al. | |
| 2006/0240938 | A1 | * | 10/2006 | Long et al. | 475/326 |
| 2006/0240939 | A1 | * | 10/2006 | Foster et al. | 477/3 |
| 2006/0246794 | A1 | * | 11/2006 | Foster et al. | 440/86 |
| 2007/0049442 | A1 | * | 3/2007 | Long et al. | 475/5 |

* cited by examiner

*Primary Examiner*—Ha Ho
*Assistant Examiner*—Justin K. Holmes (57) ABSTRACT

A powertrain has an electrically variable hybrid transmission having an electro-hydraulic control system, plurality of electrical power units, and a plurality of torque transmitting mechanisms selectively engageable by the electro-hydraulic control system to provide four forward speed ranges, a neutral condition, an electric low and high speed mode, an electrically variable low and high speed mode, and a hill hold mode. The electro-hydraulic control system permits operation in the electrically variable low mode of operation if the electrical power is interrupted when the powertrain is operating in the first forward range, electric low speed mode, electrically variable low speed mode, and hill hold mode. Additionally, the system permits operation in the electrically variable high speed mode of operation if the electrical power is interrupted when the powertrain is operating in the second through fourth forward range, electric high speed mode, and electrically variable high speed mode.

18 Claims, 7 Drawing Sheets

ELECTRO-HYDRAULIC CONTROL SYSTEM FOR AN ELECTRICALLY VARIABLE HYBRID TRANSMISSION

TECHNICAL FIELD

The present invention relates to electro-hydraulic control systems for electrically variable hybrid transmissions.

BACKGROUND OF THE INVENTION

Multi-speed power transmissions, particularly those using planetary gear arrangements, require a hydraulic system to provide controlled engagement and disengagement, on a desired schedule, of the clutches and brakes or torque transmitting mechanisms that operate to establish the ratios within the planetary gear arrangement.

These control systems have evolved from substantially pure hydraulic control systems, wherein all of the control signals are produced by hydraulic devices, to electro-hydraulic control systems, wherein a number of the control signals are produced by an electronic control unit. The electronic control unit emits electrical control signals to solenoid valves, which then issue controlled hydraulic signals to the various operating valves within the transmission control.

With many of the early pure hydraulic and first generation electro-hydraulic control systems, the power transmission utilized a number of freewheel or one-way devices which smooth the shifting or ratio interchange of the transmission during both upshifting and downshifting of the transmission. This relieves the hydraulic control system from providing for the control of overlap between the torque transmitting mechanism that was coming on and the torque transmitting mechanism that was going off. If this overlap is excessive, the driver feels a shudder in the drivetrain, and if the overlap is too little, the driver experiences engine flare or a sense of coasting. The freewheel device prevents this feeling by quickly engaging when the torque imposed thereon is reversed from a freewheeling state to a transmitting state.

The advent of electro-hydraulic devices gave rise to what is known as clutch-to-clutch shift arrangements to reduce the complexity of the transmission and the control. These electro-hydraulic control mechanisms are generally perceived to reduce cost and reduce the space required for the control mechanism.

In addition, with the advent of more sophisticated control mechanisms, the power transmissions have advanced from two-speed or three-speed transmissions to five-speed and six-speed transmissions. In at least one presently available six-speed transmission, just five friction devices are employed to provide six forward speeds, neutral condition, and a reverse speed. Such a gear arrangement is shown in U.S. Pat. No. 4,070,927 issued to Polak on Jan. 31, 1978. The use of the planetary gearset shown in the Polak patent has given rise to a number of electro-hydraulic control mechanisms, such as that shown in U.S. Pat. No. 5,601,506, issued to Long et al. on Feb. 11, 1997.

Additionally, an electrically variable hybrid transmission has been proposed to improve fuel economy and reduce exhaust emissions. The electrically variable hybrid transmission splits mechanical power between an input shaft and an output shaft into a mechanical power path and an electrical power path by means of differential gearing. The mechanical power path may include clutches and additional gears. The electrical power path may employ two electrical power units, or motor/generator assemblies, each of which may operate as a motor or a generator. With an electrical storage system, such as a battery, the electrically variable hybrid transmission can be incorporated into a propulsion system for a hybrid electric vehicle. The operation of such an electrically variable hybrid transmission is described in the published U.S. Patent Application No. 2003/0078126 by Holmes et al. and filed on Oct. 18, 2001.

The hybrid propulsion system uses an electrical power source as well as an engine power source. The electrical power source is connected with the motor/generator units through an electronic control unit, which distributes the electrical power as required. The electronic control unit also has connections with the engine and vehicle to determine the operating characteristics, or operating demand, so that the motor/generator assemblies are operated properly as either a motor or a generator. When operating as a generator, the motor/generator assembly accepts power from either the vehicle or the engine and stores power in the battery, or provides that power to operate another electrical device or another motor/generator assembly.

Two other electro-hydraulic control systems shown in U.S. Pat. Nos. 4,827,806 and 5,616,093, both issued to the assignee of this application, provide drive-home capabilities within the transmission in the event that the electronic system undergoes a malfunction or discontinuance of operation. The drive-home feature of a power transmission is an important factor in that it permits the vehicle operator to return home with the vehicle so that the proper repairs can be undertaken at a repair station rather than in the field where the vehicle underwent the malfunction.

SUMMARY OF THE INVENTION

The present invention provides an improved electro-hydraulic control system for an electrically variable hybrid transmission. The electro hydraulic control system provides both a high speed and a low speed drive home capability should electrical power to the electro-hydraulic control system be interrupted.

Accordingly, the present invention provides an electro-hydraulic control system for an electrically variable hybrid transmission having a plurality of torque transmitting mechanisms. The electro hydraulic control system includes a main source of pressurized fluid and an electrical source of electrical control signals. Also provided is a first trim valve and a second trim valve each having a first position and a second position and in selective fluid communication with the main source. The first trim valve and the second trim valve are operable to output fluid pressure when the first trim valve and the second trim valve is in the second position and to discontinue output of fluid pressure when the first trim valve and the second trim valve is in the first position. Additionally, a first logic valve is provided in selective fluid communication with the second trim valve and operable to receive pressurized fluid from the second trim valve. Also provided is a second logic valve disposed to selectively receive pressurized fluid from the first logic valve and the first trim valve, the second logic valve being operable to selectively engage one of a first and a second of the plurality of torque transmitting mechanisms.

The first and/or second trim valve may be biased to the second position each by a first normally open solenoid valve when the electrical source is inoperable. The second logic valve may operate to engage the first torque transmitting mechanism when the electrically variable hybrid transmission is operating with the first of the plurality of torque transmitting mechanisms engaged and the electrical source is inoperable. Likewise, the second logic valve may operate to effect engagement of the second of the plurality of torque transmitting mechanisms when the electrically variable hybrid transmission is operating with the second of the plurality of torque transmitting mechanisms engaged and the electrical source is inoperable. In this state, the second logic valve may be latched in position by fluid pressure from the second of the plurality of torque transmitting mechanisms. The second logic valve may also operate to prevent the engagement of the first of the plurality of torque transmitting mechanisms when the second of the plurality of torque transmitting mechanism is engaged.

Another aspect of the present invention provides an electro-hydraulic control system for an electrically variable hybrid transmission having a plurality of torque transmitting mechanisms and operable in a low range of operation wherein a first torque transmitting mechanism is engaged and a high range of operation wherein a second torque transmitting mechanism is engaged. The electro-hydraulic control system includes a main source of fluid pressure and an electrical source of electrical control signals.

Also provided is plurality of solenoid valves that are selectively energizable in response to signals from the electrical source, at least two of the solenoid valves being normally open upon interruption of electrical control signals. Additionally, first and a second trim valve selectively in fluid communication with the main source are provided. A first logic valve is disposed in downstream flow relation with the second trim valve and is connected to receive selective fluid distribution from the second trim valve. A second logic valve is disposed in selective fluid communication with the first logic valve and the first trim valve and is operable to receive selective fluid distribution from each of the first logic valve and the first trim valve. The second trim valve is operable to distribute pressurized fluid to the first logic valve. The first logic valve is operable to distribute pressurized fluid to the second logic valve. The second logic valve is operable to distribute pressurized fluid to the first torque transmitting mechanism when the electrical source is inoperable and the first torque transmitting mechanism is engaged.

The first trim valve may operate to distribute pressurized fluid to the second logic valve for distribution to the second torque transmitting mechanism when the electrical source is inoperable and the second torque transmitting mechanism is engaged. A manual valve may be provided having selective forward and neutral positions and disposed in fluid flow relation between the main source and the first trim valve and the second trim valve. The manual valve may operate to selectively distribute pressurized fluid to the first trim valve and the second trim valve when the forward position is selected. Alternatively, the manual valve may operate to discontinue pressurized fluid distribution to the first trim valve and the second trim valve when neutral position is selected.

The first and second trim valve may each be biased by a first and a second of at least two normally open solenoid valves and are operable in response to the first and second of the at least two normally open solenoid valves to output an engagement fluid pressure when the electrical source is inoperable. The second logic valve may operate to preclude engagement of the first torque transmitting mechanism when the second torque transmitting mechanism is engaged.

Yet another aspect of the present invention provides an electro-hydraulic control system for an electrically variable hybrid transmission having a plurality of torque transmitting mechanisms and operable in a low range of operation wherein a first torque transmitting mechanism is engaged and a high range of operation wherein a second torque transmitting mechanism is engaged. The electro-hydraulic control system includes a main source of fluid pressure and an electrical source of electrical control signals. A plurality of solenoid valves are provided that are selectively energizable in response to signals from the electrical source. At least two of the plurality of solenoid valves are normally open upon interruption of the electrical control signals. Also provided is a first trim valve that is selectively in fluid communication with the main source and is operable in response to one of the at least two normally open solenoid valves to output an engagement fluid pressure. Additionally, a second trim valve is provided that is selectively in fluid communication with the main source and is operable in response to another of the at least two normally open solenoid valves to output an engagement fluid pressure.

A first logic valve is disposed in downstream flow relation with the second trim valve and is connected to receive selective fluid communication from the second trim valve. The first logic valve has a spring set position and a pressure set position. A second logic valve is disposed in selective fluid communication with the first logic valve and the first trim valve and is operable to receive selective fluid distribution from each of the first logic valve and the first trim valve. The second logic valve has a spring set position and a pressure set position.

The second trim valve is operable to distribute pressurized fluid to the first logic valve. The first logic valve is operable to distribute pressurized fluid to the second logic valve. The second logic valve is operable to distribute pressurized fluid to the first torque transmitting mechanism when the electrical source is inoperable and the first torque transmitting mechanism is engaged. The first trim valve is operable to distribute pressurized fluid to the second logic valve in the pressure set position for distribution to the second torque transmitting mechanism when the electrical source is inoperable and the second torque transmitting mechanism is engaged.

A manual valve may be provided having selective forward and neutral positions and disposed in fluid flow relation between the main source and the first trim valve and the second trim valve. The manual valve may operate to selectively distribute pressurized fluid to the first trim valve and the second trim valve when the forward position is selected. Alternatively, the manual valve may operate to discontinue pressurized fluid distribution to the first trim valve and the second trim valve when neutral position is selected. The second logic valve may include a differential area operable to latch the second logic valve in the pressure set position when the second torque transmitting mechanism is engaged and the electrical source is inoperable. The second logic valve may operate to preclude engagement of the first torque transmitting mechanism when the second transmitting mechanism is engaged.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
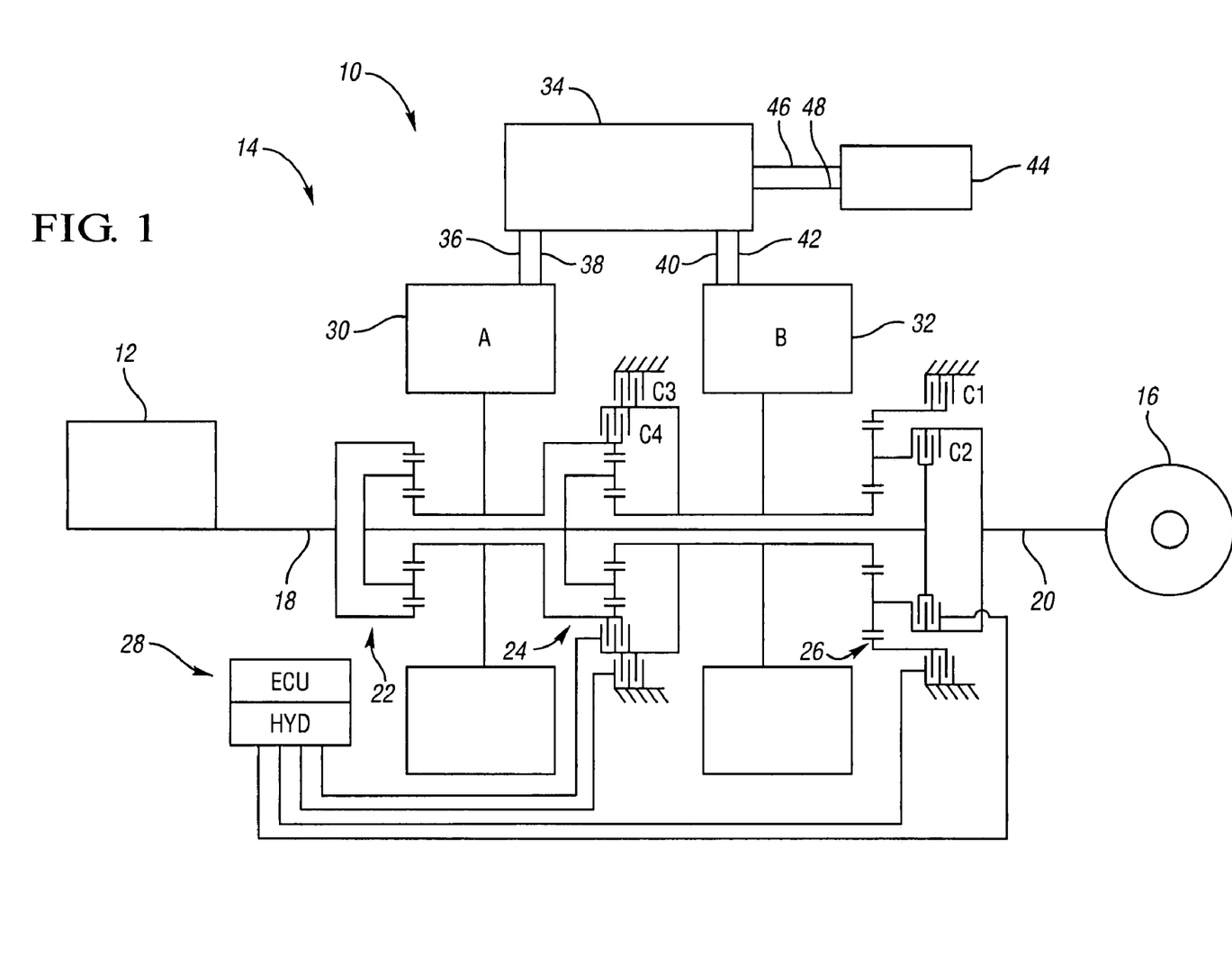
FIG. 1 is a schematic representation of a electrically variable hybrid vehicular powertrain for use with the present invention.

Referring to the drawings wherein like characters represent the same or corresponding parts throughout the several views, there is seen in FIG. 1 a powertrain 10 having an engine 12, an electrically variable hybrid transmission 14, and a conventional final drive 16.

The engine 12 is a conventional internal combustion engine. The electrically variable hybrid transmission 14 includes a planetary gear arrangement having an input shaft 18, an output shaft 20, three planetary gearsets 22, 24, and 26, four torque transmitting mechanisms C1, C2, C3, and C4, and an electro-hydraulic control system 28. The torque transmitting mechanisms C2 and C4 are conventional fluid-operated rotating clutch-type devices, while the torque transmitting mechanisms C1 and C3 are conventional fluid-operated stationary clutch or brake devices. The selective engagement and disengagement of the torque transmitting devices is controlled by an electro-hydraulic control system 28, which is shown in FIGS. 2a through 4b.

Further incorporated into the electrically variable hybrid transmission 14 is a pair of electrical power units 30 and 32 that are controlled by a conventional electronic control unit 34. The electronic control unit 34 is connected with the electrical power unit 30 through a pair of electrical conductors 36 and 38, and is connected with the electrical power unit 32 through a pair of electrical conductors 40 and 42. The electronic control unit 34 is also in electrical communication with an electrical storage device 44, which is connected with the electronic control unit 34 through a pair of electrical conductors 46 and 48. The electrical storage device 44 is generally one or more conventional electrical batteries.

The electrical power units 30 and 32 are preferably motor/generator units, which, as is well known, can operate as a power supplier or as a power generator. When operating as a motor or power supplier, the electrical power units 30 and 32 will supply power to the electrically variable hybrid transmission 14. When operating as generators, the electrical power units 30 and 32 will take electrical power from the transmission, and the electronic control unit 34 will either distribute the power to the electrical storage device 44 and/or distribute the power to the other power unit, which will be operating as a motor at that time.

As is well known in electrical controls of power transmissions, the electronic control unit 34 receives a number of electrical signals from the vehicle and transmission, such as engine speed, throttle demand, vehicle speed, to name a few. These electrical signals are used as input signals for a programmable digital computer, which is incorporated within the electronic control unit 34. The computer is then effective to distribute the electrical power as required to permit the operation of the electrically variable hybrid transmission 14 in a controlled manner.

The planetary gear arrangement, as shown in FIG. 1, provides four forward speed ratios or ranges between the input shaft 18 and the output shaft 20. In the first forward range, the torque transmitting mechanisms C1 and C4 are engaged. In the second forward range, the torque transmitting mechanisms C1 and C2 are engaged. In the third forward range, the torque transmitting mechanisms C2 and C4 are engaged. In the fourth forward range, the torque transmitting mechanisms C2 and C3 are engaged. The gearing also provides a neutral condition when the torque transmitting mechanisms C1, C2, C3 and C4 are disengaged. Additionally, a hill hold condition is provided wherein the torque transmitting mechanism C1 is engaged and C3 is in trim. An electrically variable low mode of operation is provided wherein the torque transmitting mechanism C1 is engaged, and an electrically variable high mode of operation is provided wherein the torque transmitting mechanism C2 is engaged. The powertrain 10 may also operate in a purely electric mode. The engine off, electric low speed mode of operation is facilitated by engaging the C1 torque transmitting mechanism. Whereas, the engine off, electric high speed mode of operation is facilitated by engaging the C2 torque transmitting mechanism. The powertrain 10 also has two speed ranges of drive-home capabilities within the electrically variable hybrid transmission 14 in the event that the electro-hydraulic control system 28 undergoes a malfunction or discontinuance of electrical power. In the electrical power off drive home modes, the electro-hydraulic control system 28 defaults to an electrically variable low mode of operation wherein the torque transmitting mechanism C1 is engaged, and an electrically variable high mode of operation wherein the torque transmitting mechanism C2 is engaged.

Figure 2A:
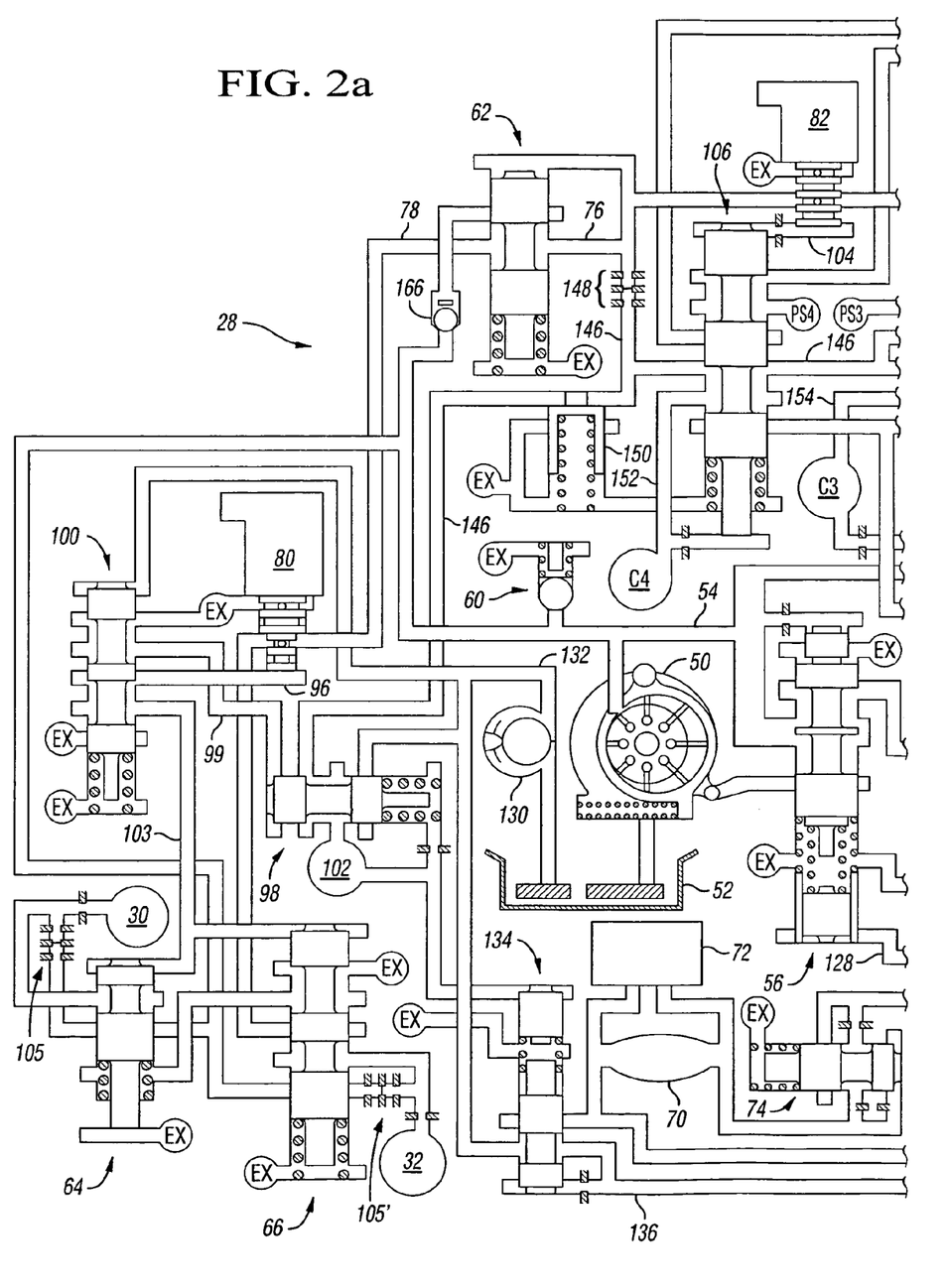
FIGS. 2a and 2b is a schematic representation describing the electro-hydraulic control system utilized with the powertrain of FIG. 1, depicting the control system in an electrical power ON, neutral mode of operation.
Figure 2B:
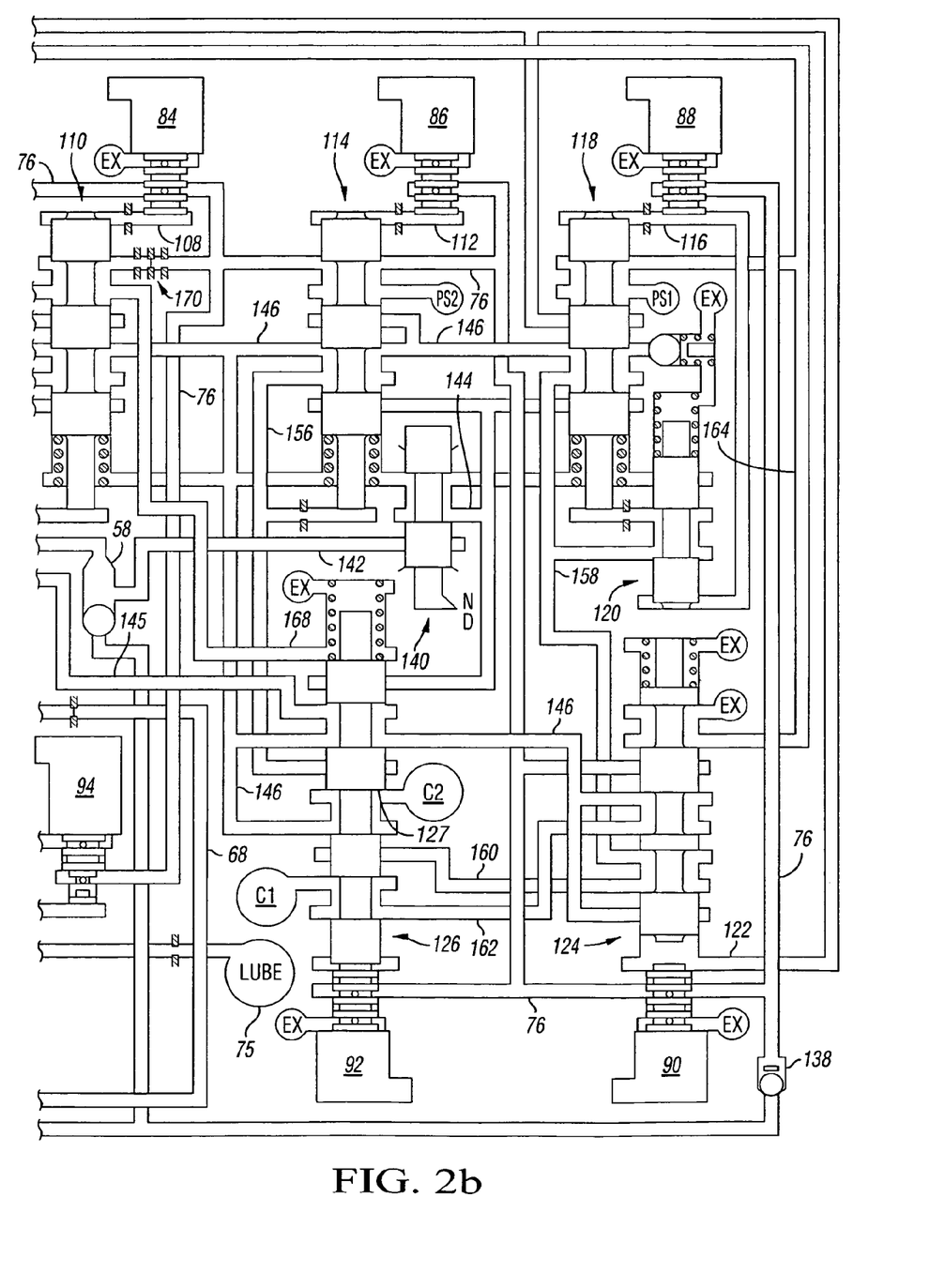

The electro-hydraulic control mechanism 28 includes an electronic control unit (ECU) and a hydraulic control unit (HYD). The ECU incorporates a conventional digital computer that is programmable to provide electrical signals to the hydraulic portion of the electro-hydraulic control system 28 to establish the engagement and disengagement of the torque transmitting mechanisms C1, C2, C3, and C4. FIGS. 2a through 4b show the electro-hydraulic control system 28 in greater detail. As shown in FIGS. 2a and 2b, the hydraulic portion of the electro-hydraulic control mechanism 28 includes a hydraulic pump 50, such as a variable volume type pump, that draws fluid from the reservoir 52 for delivery to a main passage 54. The main passage 54 is in fluid communication with a conventional line regulator valve 56, a check valve 58, a line pop-off valve 60, an actuator feed regulator 62, a motor/generator A cooling valve 64, and a motor/generator B cooling valve 66.

The line pop-off valve 60 is operable to vent pressurized fluid within the main passage 54 to the exhaust should an over pressurized condition manifest within the main passage 54. The line regulator valve 56 establishes the pressure within the main passage 54, and when that pressure is satisfied, fluid is delivered through a passage 68 to a conventional cooler 70. A cooler bypass valve 72 is in fluid communication with the passage 68 and provided in parallel with the cooler 70. The cooler bypass valve 72 is operable to provide fluid flow through passage 68 in the event that fluid passage through the cooler 70 is blocked. The fluid from the cooler 70 and/or cooler bypass valve 72 will pass through a lubrication regulator valve 74 for distribution to a lubrication system 75 of the electrically variable hybrid transmission 14.

The actuator feed regulator 62 reduces the pressure within the main passage 54 to a control pressure in passages 76 and 78. The fluid in passage 78 is communicated to a solenoid valve 80. The fluid in passage 76 is communicated to a plurality of solenoid valves 82, 84, 86, 88, 90, 92, and 94. The solenoid valves 90 and 92 are on/off type solenoid valves, while the solenoid valves 80, 82, 84, 86, 88, and 94 are variable pressure type solenoid valves. The solenoid valves 86, 88, and 94 are normally high or normally open type solenoid valves, while the remaining solenoid valves 80, 82, 84, 90, and 92 are normally low or normally closed type solenoid valves. As is well known, a normally open solenoid valve will distribute output pressure in the absence of an electrical signal to the solenoid.

Figure 3A:
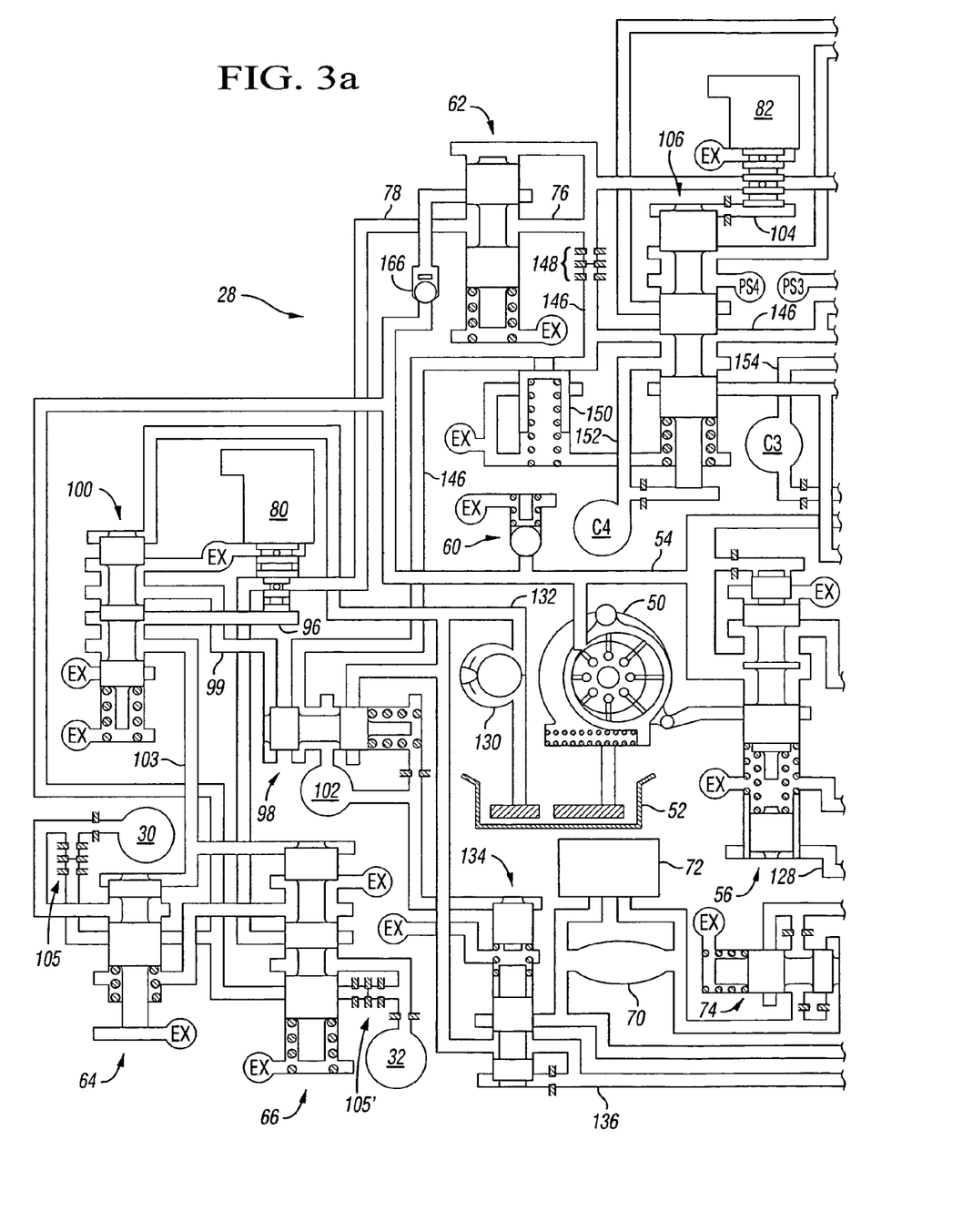
FIGS. 3a and 3b is a schematic representation similar to FIGS. 2a and 2b, depicting the control system in an electrical power OFF, electrically variable low speed mode of operation.
Figure 4A:
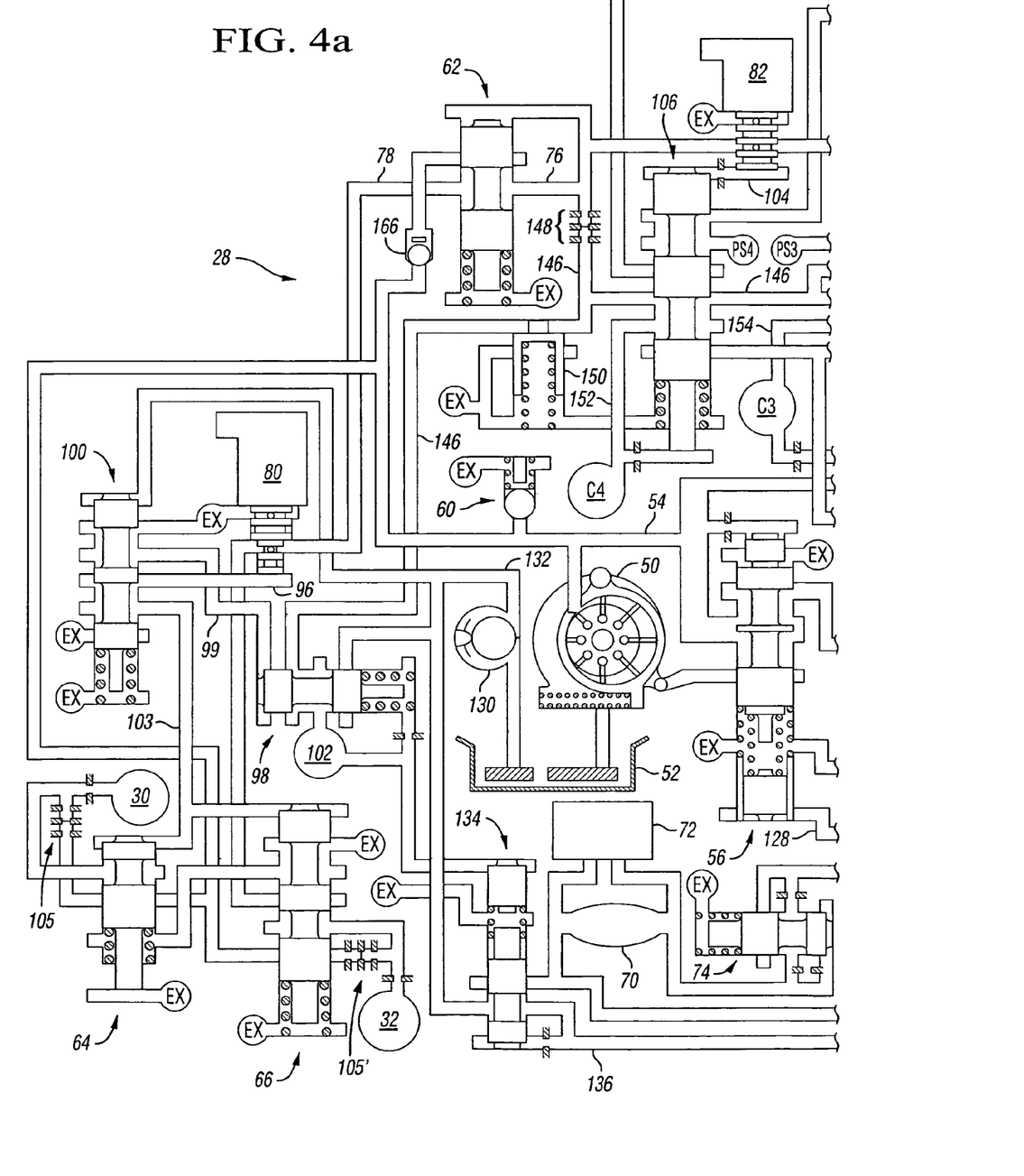
FIGS. 4a and 4b is a schematic representation similar to FIGS. 2a and 2b, depicting the control system in an electrical power OFF, electrically variable high speed mode of operation.

The solenoid valve 80 is operable to provide an output pressure in passage 96 that controls the bias pressure or control pressure on either the motor/generator A cooling valve 64 and the motor/generator B cooling valve 66 or a damper lock-out clutch trim valve 98. The state of a multiplex valve 100 will determine to which valves the pressure within the passage 96 is directed. When the multiplex valve 100 is in the pressure set position the pressurized fluid within the passage 96 will be directed to bias the damper lock-out clutch trim valve 98 via a passage 99. The damper lock-out clutch trim valve 98 is operable selectively engage the damper lock-out clutch 102. When the multiplex valve 100 is in the spring set position, as shown in FIGS. 2a, 3a, and 4a, the pressurized fluid within the passage 96 will be directed to bias the motor/generator A cooling valve 64 and the motor/generator B cooling valve 66 via a passage 103. The motor/generator A cooling valve 64 and the motor/generator B cooling valve 66 operate to effect the cooling of the electrical power unit A 30 and the electrical power unit B 32, respectively, by varying the fluid flow from the main passage 54. When the motor/generator cooling valves 64 and 66 are in the spring set position, flow restrictors 105 and 105', such as multiple orifice plates, restrict fluid flow to the electrical power units 30 and 32. Alternately when the motor/generator cooling valves 64 and 66 are in the pressure set position, the fluid flow rate will increase since the pressurized fluid within the main passage 54 can pass, unrestricted by the flow restrictors 105 and 105', to the electrical power units 30 and 32.

The solenoid valve 82 is operable to provide an output pressure in passage 104 that controls the bias pressure on a trim valve 106. The solenoid valve 84 is operable to provide an output pressure in passage 108 that controls the pressure bias on a trim valve 110. The solenoid valve 86 is operable to provide an output pressure in passage 112 that controls the pressure bias on a trim valve 114. The solenoid valve 88 is operable to provide an output pressure in passage 116 that controls the pressure bias on a trim valve 118. Additionally, the output pressure in passage 116 controls the pressure bias on a boost valve 120.

The solenoid valve 90 is operable to provide an output pressure in passage 122 that controls the pressure bias on a logic valve 124. The output pressure in passage 122 is also communicated to the trim valves 106 and 118. The solenoid valve 92 is operable to provide an output pressure that directly controls the pressure bias on a logic valve 126. The logic valve 126 has a differential area 127 operable to latch the logic valve 126 in a pressure set position when the torque transmitting mechanism C2 is engaged and electrical power to the solenoid valve 92 is interrupted. The solenoid valve 94 is operable to provide an output pressure in passage 128 that controls pressure bias to the line regulator valve 56. The solenoid valve 94, by varying the pressure within passage 128, is operable to vary the operating characteristics of the line regulator valve 56 thereby modulating the pressure value within the main passage 54 for torque based pressure control.

When the hybrid vehicle is operating in a purely electric mode, an electrically controlled hydraulic pump 130 is operable, in lieu of the hydraulic pump 50, to provide the electro-hydraulic control system 28 with a pressurized fluid source. The electrically controlled hydraulic pump draws fluid from the reservoir 52 for delivery to a passage 132. The passage 132 is in fluid communication with and provides a control pressure to bias the multiplex valve 100 into a pressure set position. Additionally, the passage 132 is in fluid communication with the damper lock-out clutch trim valve 98 and provides a pressurized source of fluid to selectively engage the damper lock-out clutch 102 when the damper lock-out clutch trim valve 98 is in a trim or pressure set position. The passage 132 is also in fluid communication with an electric mode regulator valve 134, which establishes the system pressure in the passage 132 and when that pressure is satisfied, fluid is delivered through passage 68 to the lubrication system 75 via the cooler 70 and/or bypass valve 72. Passage 136 is in fluid communication with check valves 58 and 138.

Figure 3B:
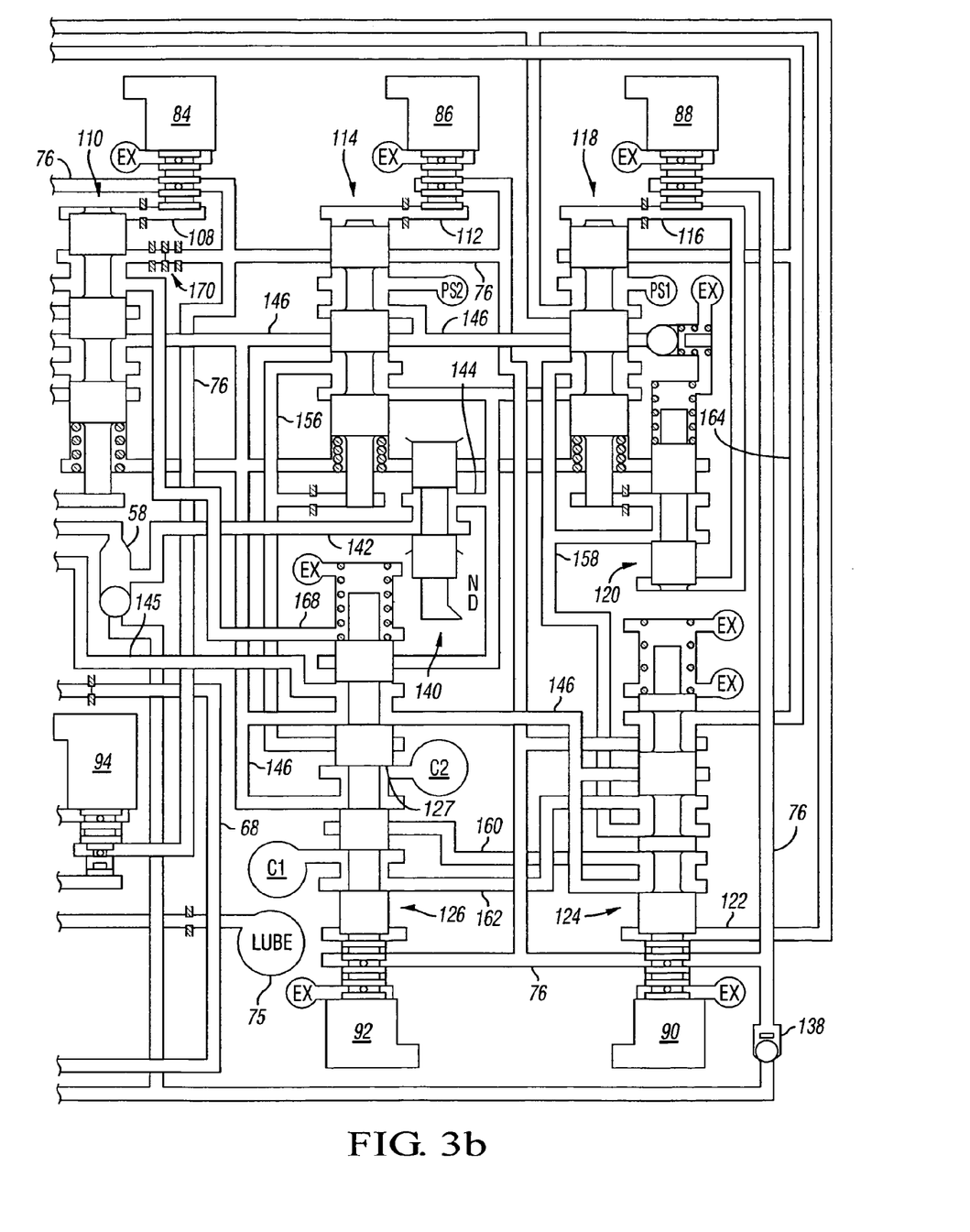
Figure 4B:
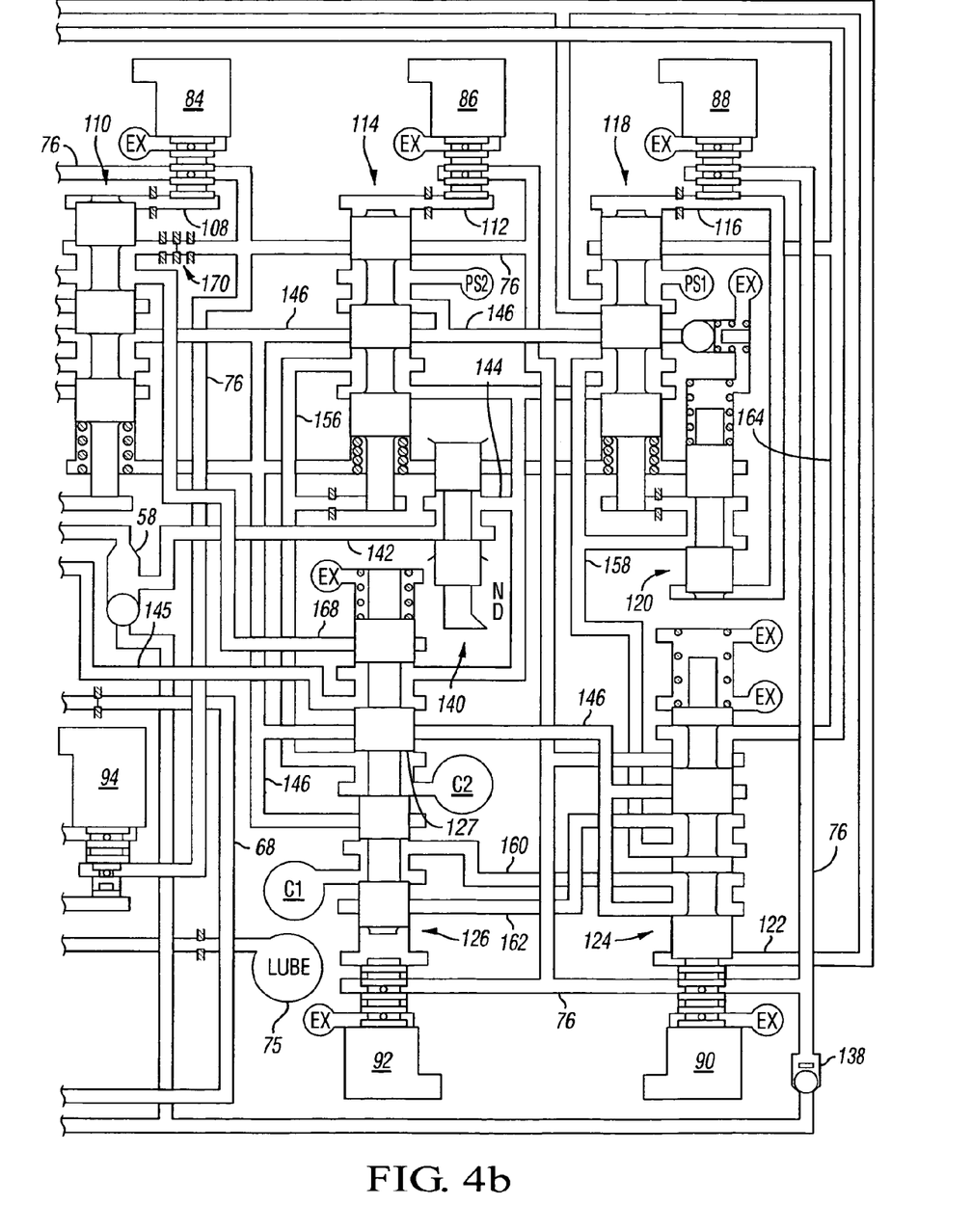

A manual valve 140 receives pressurized fluid via a passage 142. The passage 142 is in selective fluid communication with either the main passage 54 or passage 136 depending on the position of the check valve 58. The manual valve 140 has a neutral position, as shown in FIG. 2b, and a drive position, as shown in FIGS. 3b and 4b. In the neutral position, the manual valve 140 operates to block further communication of pressurized fluid within passage 142. In the drive position, the manual valve 140 communicates the pressurized fluid within passage 142 to a forward passage 144, which is in fluid communication with the trim valves 114 and 118 and the logic valve 126. The pressurized fluid within the forward passage 144 is further directed to the trim valves 106 and 110 by way of passage 145 when the logic valve 126 is controlled to the pressure set position, or when the logic valve 126 is latched in a pressure set position by the torque transmitting mechanism C2, as shown in FIG. 4b.

The passage 76 is communicated with a backfill passage 146 through a flow restriction 148, such as orifices. The back fill passage 146 communicates with a backfill check valve 150, which ensures that the pressure within the backfill passage 146 is maintained at a fixed pressure. The backfill passage 146 communicates with the trim valves 106, 110, 114, and 118, the logic valves 124 and 126, the boost valve 120, the manual valve 140, and the damper lock-out clutch trim valve 98.

The trim valve 106 selectively communicates pressurized fluid through an outlet passage 152 to effect engagement of the torque transmitting mechanism C4. Likewise, the trim valve 110 selectively communicates pressurized fluid through an outlet passage 154 to effect engagement of the torque transmitting mechanism C3. An outlet passage 156 of the trim valve 114 selectively communicates pressurized fluid to the logic valve 126. The trim valve 118 selectively communicates pressurized fluid to the boost valve 120 and the logic valve 124 through an outlet passage 158. The logic valves 124 and 126 are in selective fluid communication with one another through passages 160 and 162.

Four pressure switches PS1, PS2, PS3, and PS4 are provided for position detection of the trim valves 106, 110, 114, and 118 and the logic valves 124 and 126. The ability to monitor the above mentioned valves and detect any change, or lack of change, in valve state is of importance to provide continuous and reliable operation of the electrically variable hybrid transmission 14.

The electro-hydraulic control system 28 is capable of detecting state changes of the trim valves 106, 110, 114, and 118 and the logic valves 124 and 126 with the use of a multiplexed configuration of the four pressure switches PS1, PS2, PS3, and PS4 disposed in selective fluid communication with the trim valves 118, 114, 110, and 106, respectively. Traditionally, six pressure switches, one switch for each valve, would have been used to determine valve state changes. Detection of a state change, or failure to change, of the logic valve 124 is achieved by multiplexing the pressure switches PS1 and PS4. To achieve this, passage 164 is disposed in fluid communication with the trim valves 106 and 118 and the logic valve 124. The passage 164 is selectively pressurized based on the position of the logic valve 124. When the logic valve 124 is in the spring set position, the passage 164 is pressurized. Alternately, when the logic valve 124 is in the pressure set position, the passage 164 is depressurized or exhausted.

The passage 122 is disposed in fluid communication with the trim valves 106 and 118 and the logic valve 124. When the solenoid valve 90 is energized, the logic valve 124 moves to a pressure set condition and the passage 122 will pressurize. Alternately, when the solenoid valve 90 is de-energized, the logic valve 124 will move to a spring set condition and the passage 122 will exhaust. This multiplexed system provides a reversal in states of pressurization between the passage 164 and 122. For example, if the logic valve 124 is in the pressure set condition, the passage 122 will be pressurized and the passage 164 will exhaust. Alternately, if the logic valve 124 is in the spring set position, the passage 164 will be pressurized and the passage 122 will be exhausted. This event will be indicated through a change in logic state of both of the pressure switches PS1 and PS4 regardless of the position of their respective trim valves 118 and 106.

The detection of a state change, or failure to change, of the logic valve 126 is achieved by multiplexing the pressure switch PS3. To achieve this, a passage 168 is disposed in fluid communication with the trim valve 110 and the logic valve 126. The pressure switch PS3 is selectively pressurized with fluid from the passage 76. When the logic valve 126 is in the spring set position, the passage 168 is exhausted, thereby exhausting any pressurized fluid entering the trim valve 110 from the passage 76. A series of orifices 170 is disposed within the passage 76 to prevent the exhausting of the entire passage 76. Since no pressure builds within the trim valve 110, the pressure switch PS3 will report a low logic state. Conversely, when the logic valve 126 moves to a pressure set position, the passage 168 is blocked disallowing any exhaust flow from the passage 168. Pressurized fluid within the passage 76 is now operable to change the logic state of the pressure switch PS3 to high.

This multiplexed detection system operates in conjunction with the required valve sequencing between the logic valve 126 and the torque transmitting mechanisms C2 and C3 to effectively diagnose the state of the trim valve 110 and the logic valve 126 via pressure switch PS3. The electro-hydraulic control system 28 requires the logic valve 126 to be placed in a pressure set position prior to placing the trim valve 110 in a pressure set position. Therefore, the trim valve 110 will be positioned to allow the pressure switch PS3 to report a high logic state when the logic valve 126 is commanded to a pressure set condition. Once the logic valve 126 is in a pressure set condition, the pressure switch PS3 is operable to diagnose the trim valve 110. If the torque transmitting mechanism C1 is commanded to engage by the logic valve 126, the pressure switch PS3 should report a high logic value since the torque transmitting mechanism C3 is not engaged at the same time that the torque transmitting mechanism C1 engagement is commanded. Thus, if the pressure switch PS3 reports a low logic state, it is assumed that the trim valve 110 has moved to a pressure set position and the appropriate diagnostic response is taken. For a condition where the torque transmitting mechanism C2 is fed pressurized fluid by the logic valve 126, the torque transmitting mechanism C3 may be engaged or disengaged depending on the current transmission range. However, with the torque transmitting mechanism C2 pressurized, the logic valve 126 becomes latched in the pressure set condition. Therefore, all changes in logic state of the pressure switch PS3 must be associated with the trim valve 110. The above mentioned pressure switch logic can be applied to conditions where the pressure switch does not change logic states indicating a stuck trim valve or logic valve.

FIGS. 2a and 2b shows the electro-hydraulic control system 28 in an electrical power ON neutral mode of operation. In this mode, the logic valve 124 is pressure set by energizing the solenoid valve 90, while the logic valve 126 remains in the spring set position. By biasing the logic valve 124 into the pressure set condition, the electro-hydraulic control system 28 is protected against a single point failure to range. The manual valve 140 adds a redundant protection against a single point failure to range by blocking the pressurized fluid within the passage 142 from entering the forward passage 144. The logic valves 124 and 126 are operable to exhaust the torque transmitting mechanisms C1 and C2. The trim valves 106 and 110 are operable to exhaust the torque transmitting mechanisms C3 and C4. Pressurized fluid within the passage 76 communicates with the trim valve 114 to direct the pressure switch PS2 to report a high logic state for diagnostic purposes, while the pressure switches PS1, PS3, and PS4 will report a low logic state for diagnostic purposes.

Additionally, the trim valves 106, 110, 114, and 118, the multiplex valve 100, the motor/generator A cooling valve 64 and the motor/generator B cooling valve 66 remain in a spring set position for this mode of operation. The lubrication system 75 will continue to receive pressurized fluid by way of passage 68.

When operating in an engine OFF electric mode of operation, the internal combustion engine 12, shown in FIG. 1, is shut off and the hybrid vehicle will rely solely on the electrical storage device 44 to power the electrical power units 30 and 32 to effect movement of the vehicle. As a result, the hydraulic pump 50 will no longer provide a pressurized source of fluid within the main passage 54. Instead, the electrically controlled hydraulic pump 130 will provide fluid pressure to the electro-hydraulic control system 28 via passage 132. The fluid pressure within the passage 132 will bias the multiplex valve 100 into a pressure set position. In this position, the solenoid 80 is operable to control the fluid pressure within the passage 99 via the passage 96. As a result, the damper lock-out clutch trim valve 98 will bias to a trim position allowing pressurized fluid within the passage 132 to effect engagement of the damper lock-out clutch 102. The damper lock-out clutch 102 is operable to prevent the torsional resonance associated with starting and stopping the engine 12 from being transmitted though the powertrain 10. The multiplex valve 100 is pressure set only when the electrically controlled hydraulic pump 130 is operating. Consequently, for all of the engine ON operating conditions the multiplex valve 100 will remain in a spring set position.

Additionally, the pressurized fluid within passage 132 is communicated to the electric mode regulator valve 134 placing it in a trim condition. The electric mode regulator valve 134 will provide passage 68 with a regulated amount of fluid flow. This fluid will traverse the cooler 70 and/or the cooler bypass valve 72 prior to entering the lubrication regulator valve 74, which provides regulated fluid pressure to the lubrication system 75. The line regulator valve 56 is in a spring set position during the electric mode of operation, and is operable to block the flow of pressurized fluid within passage 68 from entering the main passage 54.

The electric mode regulator valve 134 will pass pressurized fluid from passage 132 to passage 136. The fluid within passage 136 will unseat the check valve 138, which will allow fluid to pass into the passage 76. The passage 76 will distribute pressurized fluid to each of the solenoid valves 82, 84, 86, 88, 90, 92, and 94 and the trim valve 110. Additionally, the actuator feed regulator 62, which is in a spring set position, will allow fluid to pass from passage 76 into passage 78, which in turn provides pressurized fluid to the solenoid valve 80. A check valve 166 will prevent pressurized fluid within passages 76 and 78 from entering the main passage 54.

The check valve 58 will allow pressurized fluid to pass from passage 136 into the passage 142. The manual valve 140 will provide pressurized fluid to the forward passage 144 when in the drive position, thereby providing the electro-hydraulic control system 28 with a pressurized source of fluid to effect engagement of the torque transmitting mechanisms C1, C2, C3, and C4. The manual valve 140 will be in the drive position for all operating conditions except neutral.

In the electric low speed mode of operation, the logic valve 124 is pressure set by energizing the solenoid valve 90 and the logic valve 126 is pressure set by energizing the solenoid valve 92. The trim valve 118 is pressure set by energizing the solenoid valve 88. The trim valves 106, 110, and 114 remain in a spring set position. With the above stated valve configuration, the torque transmitting mechanisms C2, C3, and C4 will exhaust, while the torque transmitting mechanism C1 will engage. To effect engagement of the torque transmitting mechanism C1, pressurized fluid from the forward passage 144 is communicated to the outlet passage 158 of the trim valve 118. The logic valve 124 will communicate the fluid within the outlet passage 158 to the passage 160. The logic valve 126 will communicate the pressurized fluid within the passage 160 to the torque transmitting mechanism C1.

The pressurized fluid within the passage 76 communicates with the trim valves 110 and 114 to direct the pressure switches PS3 and PS2, respectively, to report a high logic state for diagnostic purposes. Fluid pressure within passage 122 will direct the pressure switch PS1 to report a high logic state. The pressure switch PS4 will report a low logic state for diagnostic purposes. Since the main passage 54 is depressurized, the motor/generator cooling valves 64 and 66 will not provide fluid flow to effect the cooling of the electrical power units 30 and 32.

In the electric high speed mode of operation, the logic valve 124 is in a spring set position and the logic valve 126 is pressure set by energizing the solenoid valve 92. The trim valve 114 is pressure set by energizing the solenoid valve 86. The trim valves 106, 110, and 118 remain in a spring set position. With the above stated valve configuration, the torque transmitting mechanisms C1, C3, and C4 will exhaust, while the torque transmitting mechanism C2 will engage. To effect engagement of the torque transmitting mechanism C2, pressurized fluid from the forward passage 144 is communicated to the outlet passage 156 of the trim valve 114, which is in fluid communication with the logic valve 126. The logic valve 126 will communicate the pressurized fluid within the outlet passage 156 to the torque transmitting mechanism C2.

Pressurized fluid within the passage 76 communicates with the trim valve 110 to direct the pressure switch PS3 to report a high logic state for diagnostic purposes. Additionally, pressurized fluid within the passage 164 communicates with the trim valves 118 and 106 to direct the pressure switches PS1 and PS4, respectively, to report a high logic state for diagnostic purposes. The pressure switch PS2 will report a low logic state for diagnostic purposes. Since the main passage 54 is depressurized, the motor/generator cooling valves 64 and 66 will not provide fluid flow to effect the cooling of the electrical power units 30 and 32.

When operating in an electrically variable low speed mode of operation, the internal combustion engine 12 and the electrical power units 30 and 32 work in concert to effect movement of the vehicle. This continuously variable mode of operation employs the torque transmitting mechanism C1 in conjunction with the electrical power units 30 and 32. All garage shifts, i.e. neutral to reverse, reverse to neutral, neutral to drive, and drive to neutral, are performed while in the electrically variable, low speed mode of operation. In this mode, the logic valve 124 is pressure set by energizing the solenoid valve 90 and the logic valve 126 is pressure set by energizing the solenoid valve 92.

The trim valve 118 is pressure set by energizing the solenoid valve 88. The trim valves 106, 110, and 114 remain in a spring set position. With the above stated valve configuration, the torque transmitting mechanisms C2, C3, and C4 will exhaust, while the torque transmitting mechanism C1 will engage. To effect engagement of the torque transmitting mechanism C1, pressurized fluid from the forward passage 144 is communicated to the outlet passage 158 of the trim valve 118. The logic valve 124 will communicate the fluid within the outlet passage 158 to the passage 160. The logic valve 126 will communicate the pressurized fluid within the passage 160 to the torque transmitting mechanism C1.

Pressurized fluid within the passage 76 communicates with the trim valves 114 and 110 to direct the pressure switches PS2 and PS3, respectively, to report a high logic state for diagnostic purposes. Additionally, pressurized fluid within the passage 122 communicates with the trim valve 118 to direct the pressure switch PS1 to report a high logic state for diagnostic purposes. The pressure switch PS4 will report a low logic state for diagnostic purposes.

The solenoid valve 80 will energize to provide fluid within the passage 103 to bias the motor/generator A cooling valve 64 and the motor/generator B cooling valve 66. The pressurized fluid within the passage 103 is operable to selectively place the motor/generator A cooling valve 64 and the motor/generator B cooling valve 66 in the pressure set position. The pressurized fluid within the main passage 54 will effect cooling of the electrical power units 30 and 32 at varying rates depending on the position of each of the motor/generator cooling valves 64 and 66.

When operating in an electrically variable transmission high speed mode of operation, the internal combustion engine 12 and the electrical power units 30 and 32 work in concert to effect movement of the vehicle. This continuously variable mode of operation employs the torque transmitting mechanism C2 in conjunction with the electrical power units 30 and 32. The logic valve 126 is pressure set by energizing the solenoid valve 92, while the logic valve 124 remains in the spring set position.

The trim valve 114 is pressure set by energizing the solenoid valve 86. The trim valves 106, 110, and 118 remain in a spring set position. With the above stated valve configuration, the torque transmitting mechanisms C1, C3, and C4 will exhaust, while the torque transmitting mechanism C2 will engage. To effect engagement of the torque transmitting mechanism C2, pressurized fluid from the forward passage 144 is communicated to the outlet passage 156 of the trim valve 114, which is in fluid communication with the logic valve 126. The logic valve 126 will communicate the pressurized fluid within the outlet passage 156 to the torque transmitting mechanism C2.

Pressurized fluid within the passage 164 communicates with the trim valves 118 and 106 to direct the pressure switches PS1 and PS4, respectively, to report a high logic state for diagnostic. Additionally, pressurized fluid within the passage 76 communicates with the trim valve 110 to direct the pressure switch PS3 to report a high logic state for diagnostic purposes. The pressure switch PS2 will report a low logic state for diagnostic purposes.

The solenoid valve 80 will energize to provide pressurized fluid within the passage 103 to bias the motor/generator A cooling valve 64 and the motor/generator B cooling valve 66. The pressurized fluid within the passage 103 is operable to selectively place the motor/generator A cooling valve 64 and the motor/generator B cooling valve 66 in the pressure set position. The pressurized fluid within the main passage 54 will effect cooling of the electrical power units 30 and 32 at varying rates depending on the position of each of the motor/generator cooling valves 64 and 66.

When operating in an electrically variable hill hold mode of operation, the logic valve 124 is pressure set by energizing the solenoid valve 90 and the logic valve 126 is pressure set by energizing the solenoid valve 92.

The trim valve 118 is pressure set by energizing the solenoid valve 88 and the trim valve 110 is pressure set by energizing the solenoid valve 84. The trim valves 106 and 114 remain in a spring set position. With the above stated valve configuration, the torque transmitting mechanisms C2 and C4 will exhaust, while the torque transmitting mechanisms C1 and C3 will engage. To effect the engagement of the torque transmitting mechanism C1, pressurized fluid from the forward passage 144 is communicated to the outlet passage 158 of the trim valve 118. The logic valve 124 will communicate the fluid within the outlet passage 158 to the passage 160. The logic valve 126 will communicate the pressurized fluid within the passage 160 to the torque transmitting mechanism C1. Additionally, to effect the engagement of the torque transmitting mechanism C3, pressurized fluid from the forward passage 144 is communicated to the logic valve 126, which in turn will communicate the fluid to the passage 145. The passage 145 is in fluid communication with the trim valve 110, which will subsequently pass the pressurized fluid into the outlet passage 154 to the torque transmitting mechanism C3.

Pressurized fluid within the passage 76 communicates with the trim valve 114 to direct the pressure switch PS2 to report a high logic state for diagnostic purposes. Additionally, pressurized fluid within the passage 122 communicates with the trim valve 118 to direct the pressure switch PS1 to report a high logic state for diagnostic purposes. The pressure switches PS3 and PS4 will report a low logic state for diagnostic purposes.

The solenoid valve 80 will energize to provide fluid within the passage 103 to bias the motor/generator A cooling valve 64 and the motor/generator B cooling valve 66. The pressurized fluid within the passage 103 is operable to selectively place the motor/generator A cooling valve 64 and the motor/generator B cooling valve 66 in the pressure set position. The pressurized fluid within the main passage 54 will effect cooling of the electrical power units 30 and 32 at varying rates depending on the position of each of the motor/generator cooling valves 64 and 66.

When operating in the first forward range mode of operation, the logic valve 124 is pressure set by energizing the solenoid valve 90 and the logic valve 126 is pressure set by energizing the solenoid valve 92.

The trim valve 118 is pressure set by energizing the solenoid valve 88 and the trim valve 106 is pressure set by energizing the solenoid valve 82. The trim valves 110 and 114 remain in a spring set position. With the above stated valve configuration, the torque transmitting mechanisms C2 and C3 will exhaust, while the torque transmitting mechanisms C1 and C4 will engage. To effect the engagement of the torque transmitting mechanism C1, pressurized fluid from the forward passage 144 is communicated to the outlet passage 158 of the trim valve 118. The logic valve 124 will communicate the fluid within the outlet passage 158 to the passage 160. The logic valve 126 will communicate the pressurized fluid within the passage 160 to the torque transmitting mechanism C1. Additionally, to effect the engagement of the torque transmitting mechanism C4, pressurized fluid from the forward passage 144 is communicated to the logic valve 126, which in turn will communicate the fluid to the passage 145. The passage 145 is in fluid communication with the trim valve 106, which will subsequently pass the pressurized fluid into the outlet passage 152 to the torque transmitting mechanism C4.

Pressurized fluid within the passage 76 communicates with the trim valves 114 and 110 to direct the pressure switches PS2 and PS3, respectively, to report a high logic state for diagnostic purposes. Additionally, pressurized fluid within the passage 122 communicates with the trim valves 118 and 106 to direct the pressure switches PS1 and PS4, respectively, to report a high logic state for diagnostic purposes.

The motor/generator A cooling valve 64 and the motor/generator B cooling valve 66 are in the spring set position. Therefore, the pressurized fluid within the main passage 54 will be supplied to effect the cooling of the electrical power units 30 and 32 at a reduced flow rate than when the motor/generator cooling valves 64 and 66 are in a pressure set condition. The motor/generator cooling valves 64 and 66 will remain in the spring set position for each of the first, second, third, and fourth forward ranges.

When operating in the second forward range mode of operation, the logic valve 124 is pressure set by energizing the solenoid valve 90 and the logic valve 126 is pressure set by energizing the solenoid valve 92.

The trim valve 114 is pressure set by energizing the solenoid valve 86 and the trim valve 118 is pressure set by energizing the solenoid valve 88. The trim valves 106 and 110 remain in a spring set position. With the above stated valve configuration, the torque transmitting mechanisms C3 and C4 will exhaust, while the torque transmitting mechanisms C1 and C2 will engage. To effect the engagement of the torque transmitting mechanism C1, pressurized fluid from the forward passage 144 is communicated to the outlet passage 158 of the trim valve 118. The logic valve 124 will communicate the fluid within the outlet passage 158 to the passage 160. The logic valve 126 will communicate the pressurized fluid within the passage 160 to the torque transmitting mechanism C1. Additionally, to effect the engagement of the torque transmitting mechanism C2, pressurized fluid from the forward passage 144 is communicated to the outlet passage 156 of the trim valve 114, which is in fluid communication with the logic valve 126. The logic valve 126 will communicate the pressurized fluid within the outlet passage 156 to the torque transmitting mechanism C2.

Pressurized fluid within the passage 76 communicates with the trim valve 110 to direct the pressure switch PS3 to report a high logic state for diagnostic purposes. Additionally, pressurized fluid within the passage 122 communicates with the trim valve 118 to direct the pressure switch PS1 to report a high logic state for diagnostic purposes. The pressure switches PS2 and PS4 will report a low logic state for diagnostic purposes.

When operating in the third forward range mode of operation, the logic valve 124 is pressure set by energizing the solenoid valve 90 and the logic valve 126 is pressure set by energizing the solenoid valve 92.

The trim valve 106 is pressure set by energizing the solenoid valve 82 and the trim valve 114 is pressure set by energizing the solenoid valve 86. The trim valves 110 and 118 remain in a spring set position. With the above stated valve configuration, the torque transmitting mechanisms C1 and C3 will exhaust, while the torque transmitting mechanisms C2 and C4 will engage. To effect the engagement of the torque transmitting mechanism C2, pressurized fluid from the forward passage 144 is communicated to the outlet passage 156 of the trim valve 114, which is in fluid communication with the logic valve 126. The logic valve 126 will communicate the pressurized fluid within the outlet passage 156 to the torque transmitting mechanism C2. Additionally, to effect the engagement of the torque transmitting mechanism C4, pressurized fluid from the forward passage 144 is communicated to the logic valve 126, which in turn will communicate the fluid to the passage 145. The passage 145 is in fluid communication with the trim valve 106, which will subsequently pass the pressurized fluid into the outlet passage 152 to the torque transmitting mechanism C4.

Pressurized fluid within the passage 76 communicates with the trim valve 110 to direct the pressure switch PS3 to report a high logic state for diagnostic purposes. Additionally, pressurized fluid within the passage 122 communicates with the trim valve 106 to direct the pressure switch PS4 to report a high logic state for diagnostic purposes. The pressure switches PS1 and PS2 will report a low logic state for diagnostic purposes.

When operating in the fourth forward range mode of operation, the logic valve 126 is pressure set by energizing the solenoid valve 92, while the logic valve 124 remains in the spring set position.

The trim valve 110 is pressure set by energizing the solenoid valve 84 and the trim valve 114 is pressure set by energizing the solenoid valve 86. The trim valves 106 and 118 remain in a spring set position. With the above stated valve configuration, the torque transmitting mechanisms C1 and C4 will exhaust, while the torque transmitting mechanisms C2 and C3 will engage. To effect the engagement of the torque transmitting mechanism C2, pressurized fluid from the forward passage 144 is communicated to the outlet passage 156 of the trim valve 114, which is in fluid communication with the logic valve 126. The logic valve 126 will communicate the pressurized fluid within the outlet passage 156 to the torque transmitting mechanism C2. Additionally, to effect the engagement of the torque transmitting mechanism C3, pressurized fluid from the forward passage 144 is communicated to the logic valve 126, which in turn will communicate the fluid to the passage 145. The passage 145 is in fluid communication with the trim valve 110, which will subsequently pass the pressurized fluid into the outlet passage 154 to the torque transmitting mechanism C3.

Pressurized fluid within the passage 164 communicates with the trim valves 118 and 106 to direct the pressure switches PS1 and PS4, respectively, to report a high logic state for diagnostic purposes. The pressure switches PS2 and PS3 will report a low logic state for diagnostic purposes.

The electro-hydraulic control system 28 provides for controlled single step ratio interchanges in both an upshifting direction and a downshifting direction through engagement and disengagement of respective torque transmitting mechanisms when electrical power is available. Those skilled in the art will also recognize that the electro-hydraulic control system 28 will permit skip shifting or double ratio interchanges in the forward direction. A first forward range to third forward range interchange is available by operating the trim valves 118 and 114 to disengage the torque transmitting mechanism C1 while engaging the torque transmitting mechanism C2. Alternately, a third forward range to first forward range interchange is available by operating the trim valves 118 and 114 to engage the torque transmitting mechanism C1 while disengaging the torque transmitting mechanism C2. Additionally, a second forward range to fourth forward range interchange is available by operating the trim valves 118 and 110 to disengage the torque transmitting mechanism C1 while engaging the torque transmitting mechanism C3. Alternately, a fourth forward range to second forward range interchange is available by operating the trim valves 118 and 110 to engage the torque transmitting mechanism C1 while disengaging the torque transmitting mechanism C3.

If the electrical power to the electro-hydraulic control system 28 is interrupted and the transmission is operating with the torque transmitting mechanism C1 engaged, the electro-hydraulic control system 28 will default to an electrical power OFF, electrically variable low speed mode of operation, as shown in FIGS. 3a and 3b. In this mode, both logic valves 124 and 126 are in a spring set position since the solenoid valves 90 and 92 are normally closed type valves.

The trim valves 114 and 118 will move to a pressure set position since their respective solenoid valves 86 and 88 are normally open type valves. The trim valves 106 and 110 will move to a spring set position since their respective solenoid valves 82 and 84 are normally closed type valves. With the above stated valve configuration, the torque transmitting mechanisms C2, C3, and C4 will exhaust, while the torque transmitting mechanism C1 will engage. To effect engagement of the torque transmitting mechanism C1, pressurized fluid from the forward passage 144 is communicated to the outlet passage 158 of the trim valve 118. The logic valve 124 will communicate the fluid within the outlet passage 158 to the passage 162. The logic valve 126 will communicate the pressurized fluid within the passage 162 to the torque transmitting mechanism C1.

Pressurized fluid within the passage 164 communicates with the trim valve 106 to direct the pressure switch PS4 to report a high logic state for diagnostic purposes. The pressure switches PS1, PS2, and PS3 will report a low logic state for diagnostic purposes.

The solenoid valve 80 is normally closed, and therefore, the motor/generator A cooling valve 64 and the motor/generator B cooling valve 66 will remain in the spring set position, thereby allowing a minimal flow rate of fluid to effect cooling of the electrical power units 30 and 32. This condition will remain for both the electrical power OFF low and high speed modes of operation.

Alternately, if the electrical power to the electro-hydraulic control system 28 is interrupted and the transmission is operating with the torque transmitting mechanism C2 engaged, the electro-hydraulic control system 28 will default to an electrical power OFF, high speed mode of operation, as shown in FIGS. 4a and 4b. In this mode, the logic valve 124 is in a spring set position since the solenoid valve 90 is a normally closed type valve. The fluid pressure within the torque transmitting mechanism C2 acting upon the differential area 127 will latch the logic valve 126 in the pressure set position. This latched condition will occur when the torque transmitting mechanism C2 is engaged and electrical power is interrupted to the solenoid valve 92. Additionally, the logic valve 126 will block pressurized fluid within the passage 162 from engaging the toque transmitting mechanism C1, thereby providing protection against an inadvertent torque transmitting mechanism C1 apply at high speeds.

The trim valves 114 and 118 will move to a pressure set position since their respective solenoid valves 86 and 88 are normally open type valves. The trim valves 106 and 110 will move to a spring set position since their respective solenoid valves 82 and 84 are normally closed. With the above stated valve configuration, the torque transmitting mechanisms C1, C3, and C4 will exhaust, while the torque transmitting mechanism C2 will engage. To effect engagement of the torque transmitting mechanism C2, pressurized fluid from the forward passage 144 is communicated to the outlet passage 156 of the trim valve 114, which is in fluid communication with the logic valve 126. The logic valve 126 will communicate the pressurized fluid within the outlet passage 156 to the torque transmitting mechanism C2.

Pressurized fluid within the passage 164 communicates with the trim valve 106 to direct the pressure switch PS4 to report a high logic state for diagnostic purposes. The pressure switches PS1, PS2, and PS3 will report a low logic state for diagnostic purposes. The passage 76 communicates with the trim valve 10 to direct the pressure switch PS3 to report a high logic state for diagnostic purposes.

While the best modes for carrying out the invention have been described in detail, those familiar with the art to which this invention relates will recognize various alternative designs and embodiments for practicing the invention within the scope of the appended claims.

The invention claimed is:

1. An electro-hydraulic control system for an electrically variable hybrid transmission having a plurality of torque transmitting mechanisms, said electro-hydraulic control system comprising:
    a main source of pressurized fluid;
    an electrical source of electrical control signals;
    a first trim valve and a second trim valve each having a first position and a second position and in selective fluid communication with said main source, said first trim valve and said second trim valve being operable to output fluid pressure when said first trim valve and said second trim valve are in said second position and to discontinue output of fluid pressure when said first trim valve and said second trim valve are in said first position;
    wherein said first trim valve and said second trim valve are biased to said second position when said electrical source is inoperable;
    a first logic valve in selective fluid communication with said second trim valve and operable to receive pressurized fluid from said second trim valve; and
    a second logic valve disposed to selectively receive pressurized fluid from said first logic valve and said first trim valve, said second logic valve being operable to selectively engage one of a first and a second of said plurality of torque transmitting mechanisms.

2. The electro-hydraulic control system of claim 1, wherein said second logic valve is operable to effect engagement of said first of said plurality of torque transmitting mechanisms when said electrically variable hybrid transmission is operating with said first of said plurality of torque transmitting mechanisms engaged and said electrical source is inoperable.

3. The electro-hydraulic control system of claim 1, wherein said second logic valve is operable to effect engagement of said second of said plurality of torque transmitting mechanisms when said electrically variable hybrid transmission is operating with said second of said plurality of torque transmitting mechanisms engaged and said electrical source is inoperable.

4. The electro-hydraulic control system of claim 1, further comprising:
    a first normally open solenoid valve selectively energizable by said electrical source, wherein said first trim valve is biased to said second position by said first normally open solenoid valve when said electrical source is inoperable.

5. The electro-hydraulic control system of claim 1, further comprising:
    a second normally open solenoid selectively energizable by said electrical source, wherein said second trim valve is biased to said second position by said second normally open solenoid valve when said electrical source is inoperable.

6. The electro-hydraulic control system of claim 3, wherein said second logic valve is latched in position by fluid pressure from said second of said plurality of torque transmitting mechanisms when said second of said plurality of torque transmitting mechanisms is engaged and said electrical source is inoperable.

7. The electro-hydraulic control system of claim 1, wherein said second logic valve is operable to prevent the engagement of said first of said torque transmitting mechanisms when said second of said torque transmitting mechanisms is engaged.

8. The electro-hydraulic control system of claim 1 further comprising:
    a manual valve having selective forward and neutral positions and being disposed in fluid flow relation between said main source and said first trim valve and said second trim valve and operable to selectively distribute pressurized fluid to said first trim valve and said second trim valve when said forward position is selected, and to discontinue pressurized fluid distribution to said first trim valve and said second trim valve when said manual valve is in said neutral position.

9. An electro-hydraulic control system for an electrically variable hybrid transmission having a plurality of torque transmitting mechanisms and operable in a low range of operation wherein a first torque transmitting mechanism is engaged and a high range of operation wherein a second torque transmitting mechanism is engaged, said electro-hydraulic control system comprising:
    a main source of fluid pressure;
    an electrical source of electrical control signals;
    a plurality of solenoid valves that are selectively energizable in response to signals from said electrical source, at least two of said solenoid valves being normally open upon interruption of electrical control signals;
    a first trim valve selectively in fluid communication with said main source;

a second trim valve selectively in fluid communication with said main source;

a first logic valve disposed in downstream flow relation with said second trim valve and being connected to receive selective fluid distribution from said second trim valve;

a second logic valve disposed in selective fluid communication with said first logic valve and said first trim valve and operable to receive selective fluid distribution from each of said first logic valve and said first trim valve; and said second trim valve being operable to distribute pressurized fluid to said first logic valve, said first logic valve being operable to distribute pressurized fluid to said second logic valve, and said second logic valve being operable to distribute pressurized fluid to said first torque transmitting mechanism when said electrical source is inoperable and said first torque transmitting mechanism is engaged.

10. The electro-hydraulic control system for an electrically variable hybrid transmission of claim 9, wherein said first trim valve is operable to distribute pressurized fluid to said second logic valve for distribution to said second torque transmitting mechanism when said electrical source is inoperable and said second torque transmitting mechanism is engaged.

11. The electro-hydraulic control system for an electrically variable hybrid transmission of claim 9 further comprising:

a manual valve having selective forward and neutral positions and disposed in fluid flow relation between said main source and said first trim valve and said second trim valve and operable to selectively distribute pressurized fluid to said first trim valve and said second trim valve when said forward position is selected, and to discontinue pressurized fluid distribution to said first trim valve and said second trim valve when said manual valve is in said neutral position.

12. The electro-hydraulic control system for an electrically variable hybrid transmission of claim 9, wherein said first trim valve is biased by a first of said at least two normally open solenoid valves and is operable in response to said first of said at least two normally open solenoid valves to output an engagement fluid pressure when said electrical source is inoperable.

13. The electro-hydraulic control system for an electrically variable hybrid transmission of claim 9, wherein said second trim valve is biased by a second of said at least two normally open solenoid valves and being operable in response to said second of said at least two normally open solenoid valves to output an engagement fluid pressure when said electrical source is inoperable.

14. The electro-hydraulic control system for an electrically variable hybrid transmission of claim 9, wherein said second logic valve is operable to preclude engagement of said first torque transmitting mechanism when said second torque transmitting mechanism is engaged.

15. An electro-hydraulic control system for an electrically variable hybrid transmission having a plurality of torque transmitting mechanisms and operable in a low range of operation wherein a first torque transmitting mechanism is engaged and a high range of operation wherein a second torque transmitting mechanism is engaged, said electro-hydraulic control system comprising:

a main source of fluid pressure;

an electrical source of electrical control signals;

a plurality of solenoid valves that are selectively energizable in response to signals from said electrical source, at least two of said plurality of solenoid valves being normally open upon interruption of electrical control signals;

a first trim valve selectively in fluid communication with said main source and being operable in response to one of said at least two normally open solenoid valves to output an engagement fluid pressure;

a second trim valve selectively in fluid communication with said main source and being operable in response to another of said at least two normally open solenoid valves to output an engagement fluid pressure;

a first logic valve disposed in downstream flow relation with said second trim valve and being connected to receive selective fluid communication from said second trim valve, said first logic valve having a spring set position and a pressure set position;

a second logic valve disposed in selective fluid communication with said first logic valve and said first trim valve and operable to receive selective fluid distribution from each of said first logic valve and said first trim valve, said second logic valve having a spring set position and a pressure set position;

said second trim valve being operable to distribute pressurized fluid to said first logic valve, said first logic valve being operable to distribute pressurized fluid to said second logic valve, said second logic valve being operable to distribute pressurized fluid to a first of said torque transmitting mechanisms when said electrical source is inoperable and said first torque transmitting mechanism is engaged; and said first trim valve being operable to distribute pressurized fluid to said second logic valve in said pressure set position for distribution to said second torque transmitting mechanism when said electrical source is inoperable and said second torque transmitting mechanism is engaged.

16. The electro-hydraulic control system for an electrically variable hybrid transmission of claim 15 further comprising:

a manual valve having selective forward and neutral positions and being disposed in fluid flow relation between said main source and said first trim valve and said second trim valve and operable to selectively distribute pressurized fluid to said first trim valve and said second trim valve when said forward position is selected, and to discontinue pressurized fluid distribution to said first trim valve and said second trim valve when said manual valve is in said neutral position.

17. The electro-hydraulic control system for an electrically variable hybrid transmission of claim 15, wherein said second logic valve includes a differential area, said differential area being operable to latch said second logic valve in said pressure set position when said second torque transmitting mechanisms is engaged and said electrical source is inoperable.

18. The electro-hydraulic control system for an electrically variable hybrid transmission of claim 15, wherein said second logic valve is operable to preclude engagement of said first torque transmitting mechanisms when said second torque transmitting mechanisms is engaged.

* * * * *